Figure 1:
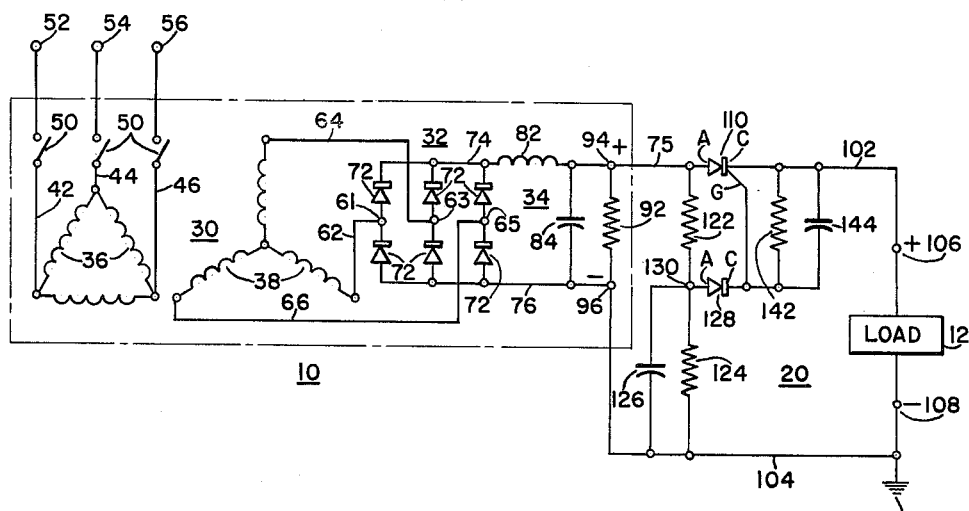

Nov. 3, 1964 T. M. KIRCHMIER 3,155,847
CIRCUIT FOR PROTECTING A LOAD CIRCUIT FROM
INITIAL POWER SUPPLY VOLTAGE TRANSIENTS
Filed Feb. 19, 1963

WITNESSES
Theodore F. Wrobel
Donald R. Lackey

INVENTOR
Thomas M. Kirchmier
BY
F. E. Browder
ATTORNEY

United States Patent Office 3,155,847
Patented Nov. 3, 1964

3,155,847
CIRCUIT FOR PROTECTING A LOAD CIRCUIT FROM INITIAL POWER SUPPLY VOLTAGE TRANSIENTS
Thomas M. Kirchmier, Glen Burnie, Md., assignor to Westinghouse Electric Corporation, Pittsburgh, Pa., a corporation of Pennsylvania
Filed Feb. 19, 1963, Ser. No. 259,618
4 Claims. (Cl. 307—93)

This invention relates in general to electrical power supplies and more particularly to protective systems for preventing transient voltages produced when an alternating current to direct current power supply is energized, from being applied to the load connected to the power supply.

When an alternating current to direct current power supply is energized or connected to an alternating potential source, the power supply may momentarily produce an output voltage greatly in excess of the steady state output voltage the power supply was designed to produce. Transient voltages are usually produced when the transformer in the power supply is energized. Transient voltages in the transformer secondary circuit may be equal to twice the amplitude of the steady state peak voltage. Transient voltages may also be produced when a voltage step is applied to a series choke-shunt capacitor wave filter network, the transient voltage being produced due to a voltage overshoot appearing across the capacitor terminals and hence being applied to the output terminals of the power supply. The voltage step required to produce this transient voltage due to voltage overshoot on the capacitor need not be an abnormally high voltage, but may be the steady state value being applied to the wave filter network after the previous value had been less or zero for any length of time.

Load voltages greater than steady state values are very undesirable, especially when the connected load circuit contains voltage sensitive semiconductor devices, or other voltage sensitive apparatus.

Methods commonly used for reducing the power supply voltage overshoot usually have other disadvantages, or are limited in use. For example, step-type starting may be used, utilizing resistors which are momentarily connected in a series circuit relationship with the power supply transformer when the alternating potential is initially applied. This type of step-starting reduces overshoot satisfactorily when load currents are high, but is not suitable for small load currents.

Another example involves using a small inductance to capacitance ratio in the power supply wave filter. However, for a fixed ripple to average voltage ratio, reducing the inductance requires a corresponding increase in capacitance. The product of the inductance and capacitance must exceed a certain minimum, to insure a required ripple factor.

Accordingly, it is an object of this invention to provide a new and improved system for protecting electrical apparatus from initial voltage transients.

Another object of this invention is to provide a new and improved voltage transient isolating system that is completely automatic and utilizes all static components.

A further object of this invention is to provide a new and improved system for isolating load circuits from the transient voltages produced by alternating current to direct current power supplies, when the power supplies are energized.

Another object of this invention is to provide a new and improved system for isolating load circuits from transient voltages produced by power supplies, that is equally effective for all values of current being supplied to the load circuit from the power supply.

Briefly, the present invention accomplishes the above-cited objects by providing a system utilizing static semiconductor devices that act as a delay switch, automatically preventing application of the power supply voltage to the load circuit for a period of time sufficient to allow the power supply output to reach its steady state value. More specifically, a semiconductor controlled rectifier is connected with its main electrodes in a series circuit relationship with the power supply and the load circuit, with the conduction of the controlled rectifier being delayed until a charging capacitor, connected in the control electrode circuit of the controlled rectifier, reaches a magnitude sufficient to cause the controlled rectifier to conduct, or change from its blocking state to a low impedance state. The values of the circuit components are chosen so that the time delay in causing the controlled rectifier to conduct exceeds the time it takes for the power supply output voltage to reach its steady state value.

Further objects and advantages of the invention will become apparent as the following description proceeds and features of novelty which characterize the invention will be pointed out in particularity in the claims annexed to and forming a part of this specification.

Figure 2:
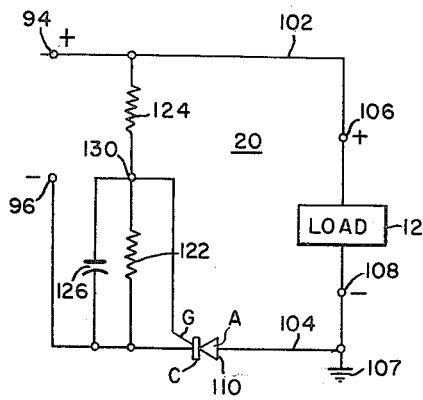

For a fuller understanding of the nature and objects of the invention, reference should be had to the following detailed description taken in connection with the accompanying drawings in which FIGURES 1 and 2 diagrammatically illustrate the invention.

Referring now to the drawings and FIGURE 1 in particular, there is shown a typical alternating current to direct current power supply 10 connected to a load circuit represented by load 12. Connected in circuit relationship with the power supply 10 and the load circuit 12 is the transient voltage isolating circuit 20. More specifically, alternating to direct current power supply 10, which may be of any type, is in this instance comprised of transformer 30, three-phase, full wave bridge rectifier 32 and wave filter network 34. In order to obtain an alternating current voltage of the proper magnitude, a transformer 30 may be utilized which includes primary and secondary windings 36 and 38, respectively, suitably disposed on a magnetic core (not shown), with primary winding 36 connected through lines 42, 44 and 46 to input terminals 52, 54, and 56 and hence to a source of alternating potential (not shown). Switch or circuit interrupting device 50 has contacts connected in lines 42, 44 and 46 and serves to make and break the connection of the alternating potential source to the transformer primary winding 36. The secondary winding 38 of transformer 30 is connected to bridge rectifier 32 at terminals 61, 63 and 65 through lines 62, 64 and 66, respectively. Bridge rectifier 32, which may be comprised of a plurality of semiconductor diode rectifiers 72, rectifies the alternating potential applied to terminals 61, 63 and 65 and delivers 3-phase full wave rectified direct current to the conductors 74 and 76.

In order to smooth or reduce the ripple in the direct current voltage produced by the bridge rectifier 32, the direct current conductors 74 and 76 are connected to wave filter network 34. More specifically, waveform filter network 34, is, in this instance, comprised of choke or inductor 82 and capacitor 84, with choke 82 connected in a series circuit relationship with conductors 74 and 75, and capacitor 84 connected between the direct current conductors 75 and 76.

In order to provide a discharge path for capacitor 84, and also serve as a fixed load to bleed off a constant value of current, resistor 92 may be connected across the direct current conductors 75 and 76 at terminals 94 and 96. Terminals 94 and 96 may also serve as direct current output terminals of the power supply.

In order to prevent the initial output voltage of the power supply 10 from being applied to load 12, since the initial voltage may contain harmful voltage transients with magnitudes exceeding the steady state voltage, an initial voltage isolation circuit 20 is connected in circuit relationship with the power supply 10 and the load 12.

The initial voltage isolation circuit 20 is connected to the output terminals 94 and 96 of power supply 10 and through conductors 102 and 104 to load terminals 106 and 108 of the load circuit 12. In order to block the initial application of the power supply voltage to the load 12, a static device having controllable switching characteristics, such as a semiconductor controlled rectifier 110, is connected in a series circuit relationship with the power supply 10 and the load circuit 12 in either the positive or negative line conductors 102 or 104, respectively. In this instance, the semiconductor controlled rectifier, which may be a silicon device having main electrodes or anode A and cathode C, and control or gate electrode G, is connected in the positive condctor 102. As hereinbefore stated, controlled rectifier 110 is connected in a series circuit relationship with the power supply 10 and the load 12, with its anode connected to the positive terminal 94 of power supply 10 and its cathode connected to the positive terminal 106 of the load circuit 12. The negative bus 104 may be grounded as shown at 107.

In order to apply a signal or current to the gate electrode G of controlled rectifier 110 and cause controlled rectifier 110 to start conduction a predetermined time after the power supply 10 is energized, resistors 122 and 124, capacitor 126 and rectifier 128 are connected in circuit relation with the voltage output of power supply 10, the load 12, the gate or control electrode G and the cathode electrode C of controlled rectifier 110. Switching controlled rectifier 110 from a non-conducting to a conducting state requires that the gate electrode G be sufficiently more positive than the cathode electrode C, to cause sufficient gate current to flow, when the anode electrode A is positive with respect to the cathode electrode C. In order to cause load current to flow, the cathode C of controlled rectifier 110 is connected to ground potential 107 through load 12. More specifically, resistors 122 and 124 are connected in series circuit relationship across the output of power supply 10, between line conductors 75 and 104, and capacitor 126 is connected in a parallel circuit relationship with resistor 124, or connected from the junction 130 of the resistors 122 and 124 to the conductor 104. Rectifier 128, which may be a semiconductor diode type rectifier having an anode electrode A and cathode electrode C, is connected from the junction 130 of resistors 122 and 124 to the gate electrode G of the controlled rectifier 110, with the anode A being connected to junction 130 and the cathode C being connected to the gate electrode G of controlled rectifier 110.

In order to protect the controlled rectifier 110 from destruction due to excessive voltage between its gate electrode G and its cathode electrode C, resistor 142 and capacitor 144 are connected in parallel circuit relationship from the gate electrode G to the cathode electrode C of controlled rectifier 110. The semiconductor diode 128, previously described, also has the function of protecting controlled rectifier 110 from destructive gate to cathode voltages.

In the operation of the circuit shown in FIGURE 1, we will first consider the instant prior to the closing of switch 50. The controlled rectifier 110 will be in its non-conducting state, capacitor 126 will have zero charge and junction 130, the positive load terminal 106, and the cathode C of controlled rectifier 110 will each be at ground potential. To cause the controlled rectifier 110 to switch from a non-conducting to a conducting state, the anode electrode A must be sufficiently more positive than the cathode electrode C, and, simultaneously, the gate electrode G must be sufficiently more positive than the cathode electrode C. Once the controlled rectifier 110 has changed to its conducting state, it will remain conducting regardless of the gate to cathode voltage as long as the anode to cathode current remains greater than a small value of current commonly called the holding current.

A short interval of time after the closing of switch 50, a direct current voltage will be produced at the output terminals of power supply 10, with the initial voltage containing transients produced by transformer 30 and wave filter network 34. This voltage will be applied to the series resistance combination of resistors 122 and 124. However, because of the action of capacitor 126 paralleling resistor 124, the entire output voltage of the power supply 10 initially appears across resistor 122. More specifically, a voltage across a capacitor cannot change instantaneously; a definite interval of time is required to charge a capacitor, with the voltage increasing from zero to the charging voltage in a predictable manner with respect to time. Since capacitor 126 was not charged before switch 50 was closed, the voltage across capacitor 126 was zero at the instant switch 50 was closed, and the entire voltage output of power supply 10 at this instant, therefore, appears across resistor 122, with no voltage drop occurring across the parallel combination of resistor 124 and capacitor 126. Therefore, even though the anode electrode A of controlled rectifier 110 is positive with respect to its cathode electrode C soon after the switch 50 is closed, the controlled rectifier 110 does not conduct as the gate electrode G of controlled rectifier 110 is not positive with respect to the cathode electrode C. As the capacitor 126 starts to charge, a positive voltage with respect to ground will appear at junction 130, and when the voltage at junction 130 reaches a magnitude that makes the gate electrode G sufficiently positive with respect to the cathode electrode C, the controlled rectifier 110 changes from its non-conducting to a conducting state and the gate electrode G loses any further control over the conduction of controlled rectifier 110 until the controlled rectifier cathode current becomes less than the "holding current."

The transient voltage overshoot occurring upon the initial energization of the power supply 10 lasts for only a small fraction of a second. Therefore, the values of the resistor 122 and capacitor 126 are selected to produce a time constant or charging rate that causes controlled rectifier 110 to conduct after the starting transient has terminated. For a given power supply output voltage amplitude, the maximum resistance value of resistor 122 is that value which will conduct the minimum gate current required to change controlled rectifier 110 from a non-conducting to a conducting state. The resistance values of resistors 122 and 124 should be related such that the steady state voltage across resistor 124 will be sufficient to cause the controlled rectifier 110 to become conducting, and will be less than the voltage which would cause damage to the gate electrode G of controlled rectifier 110.

For example, a typical silicon controlled rectifier requires that the anode be more positive than its cathode by .7 to 200 volts and the gate to be more positive than the cathode by .7 to 3 volts. A typical gate current from gate electrode G to cathode electrode C necessary to cause the controlled rectifier to conduct is 15 milliamperes at 1.5 volts, and a typical holding current or anode to cathode current required to keep the controlled rectifier in a conducting state is 20 milliamperes. Therefore, in using a silicon controlled rectifier having the preceding mentioned characteristics, the value of the resistor 122 would be chosen to allow a gate current greater than 15 milliamperes but less than maximum rated gate current to flow from the gate electrode G to cathode electrode C, and the value of the resistor 124 would be chosen to produce a voltage greater than 1.5 volts but less than the maximum rated gate to cathode voltage at the junction 130 between resistors 122 and 124. The value of capacitor 126 would be chosen to produce a time constant in combination with the resistor 122 that is longer than the time the initial transient exists upon the energization of the power supply 10.

In order to protect the controlled rectifier 110 from destructive gate to cathode voltages, the circuit must be so designed as not to exceed the permissible forward and reverse gate to cathode voltages, which typically are 10 and 5 volts, respectively. Semiconductor diode 128, resistor 142 and capacitor 144 function to limit the gate to cathode voltage within these rated values. If the gate electrode G of controlled rectifier 110 were to be connected directly to junction 130 between resistors 122 and 124, the gate to cathode voltage of controlled rectifier 110 could change from less than 1.5 volts to more than 100 volts as the controlled rectifier 110 switches from its non-conducting to its conducting state. To prevent this voltage increase, capacitor 144 is connected from the cathode electrode C to the gate electrode G of controlled rectifier 110. The voltage across the capacitor 144 cannot change instantaneously, therefore, capacitor 144 causes the gate to cathode voltage to remain constant during the instant the controlled rectifier 110 switches to its conducting state. The gate voltage, therefore, follows the increasing cathode voltage. Semiconductor diode 128 allows the voltage across resistor 124 to control the gate voltage when controlled rectifier 110 is non-conducting and allows the cathode voltage of controlled rectifier 110 to control the gate voltage when controlled rectifier 110 is conducting.

In summary, as switch 50 is closed, energizing power supply 10 and producing transient voltages caused by the transformer 30 and wave filter 34, the controlled rectifier 110 blocks the application of voltage to the load 12 for a period of time sufficient to allow the voltage output of power supply 10 to reach its steady state value. The delay time in the switching of controlled rectifier 110 to a conducting state is determined by resistors 122 and 124 and capacitor 126, the combination producing a voltage at junction 130 sufficient to cause controlled rectifier 110 to become conductive a predetermined time after the power supply 10 is energized.

It is to be understood, that although controlled rectifier 110 is illustrated as being connected in the positive conductor 102 of power supply 10, it would be equally effective to connect the controlled rectifier 110 in the negative chassis connected to conductor 104, as shown in FIG. 2. Like reference numerals in FIGS. 1 and 2 indicate like components. FIG. 2 illustrates an initial voltage isolation circuit 20 which may be connected to a suitable power supply at terminals 94 and 96. If controlled rectifier 110 were to be connected in the negative conductor 104 between the power supply 10 and the load circuit 12, the semiconductor rectifier 128, resistor 142 and the capacitor 144 would not be required, as the cathode C of controlled rectifier 110 would remain at the power supply negative terminal voltage and there would be no possibility of damaging cathode to gate voltages occurring. However, the possibility that the negative terminal 108 of the load 12 may be connected externally by clip leads or chassis contact is a disadvantage in locating the controlled rectifier 110 in the negative chassis connected lead 104.

It will, therefore, be apparent that there has been disclosed a new and improved system for isolating load circuits from transient voltages produced by alternating current to direct current power supplies. It will also be apparent that the system is effective regardless of the magnitude of current required by the connected load.

The power supply 10 illustrated in FIG. 1 is meant to be illustrative only, as it is obvious that the invention will operate effectively with any type of alternating current to direct current power supply, whether it is polyphase as illustrated, or single phase.

Since numerous changes may be made in the above described apparatus and different embodiments of the invention may be made without departing from the spirit thereof, it is intended that all matter contained in the foregoing description or shown in the accompanying drawing shall be interpreted as illustrative, and not in a limiting sense.

I claim as my invention:

1. In an electrical circuit having positive and negative input terminals and positive and negative output terminals, the combination comprising a silicon controlled rectifier having an anode electrode, cathode electrode, and a control electrode, said anode electrode being connected to said positive input terminal and said cathode electrode being connected to said positive output terminal, said negative input and output terminals being connected to a common point, first and second resistors connected serially between said positive and negative input terminals, said first resistor being connected to said positive input terminal and said second resistor being connected to said negative input terminal, a semiconductor diode connected from the junction of said first and second resistors to said control electrode, said semiconductor diode being poled to allow current to flow from the junction of said first and second resistors to said control electrode, a first capacitor connected in a parallel circuit relationship with said second resistor, a third resistor connected from the positive ouput terminal to said control electrode, a second capacitor connected from the positive output terminal to said control electrode, the values of said first and second resistors and first capacitor being such that said silicon controlled rectifier changes from its blocking to a conducting state a predetermined interval of time after application of a unidirectional potential to said positive and negative input terminals, the values of said third resistor, second capacitor and semiconductor diode being such that said silicon controlled rectifier is protected from damage during the switching of said silicon controlled rectifier.

2. In an electric circuit having positive and negative input terminals connected to a unidirectional voltage source and positive and negative output terminals connected to a load circuit, the combination comprising a controlled rectifier having an anode electrode, cathode electrode, and a control electrode, said anode and cathode electrodes connected between said negative input and output terminals with said cathode electrode being connected to the said negative input terminal and said anode electrode being connected to said negative output terminal, said positive input and output terminals being connected to a common point, first and second resistors connected serially between said positive and negative input terminals, said first resistor being connected to said negative input terminal and said second resistor being connected to said positive input terminal, the control electrode of said controlled rectifier being connected to the junction between said first and second resistors, and a capacitor connected in a parallel circuit relationship with said first resistor, the values of resistance and capacitance of said first and second resistors and capacitor being selected so that a signal of sufficient magnitude to cause said controlled rectifier to switch from its blocking state to a conducting state is applied to the control electrode of said controlled rectifier a predetermined time after said unidirectional voltage source is applied to said positive and negative input terminals.

3. In an electrical circuit having positive and negative input terminals connected to a unidirectional voltage source and positive and negative output terminals connected to a load circuit, the combination comprising a silicon controlled rectifier having an anode electrode, cathode electrode, and a control electrode, said anode electrode being connected to said positive input terminal and said cathode electrode being connected to said positive output terminal, said negative input and output terminals being connected to a common point, first and second resistors connected serially between said positive and negative input terminals, said first resistor being connected to said positive input terminal and said second resistor being connected to said negative input terminal, said control electrode of said silicon controlled rectifier being connected to the junction between said first and second resistors, and a capacitor connected in a parallel circuit relationship with said second resistor, the values of resistance and capacitance of said first and second resistors and capacitor being selected so that a signal of the required magnitude to cause said silicon controlled rectifier to switch from its blocking state to a conducting state is applied to the control electrode a predetermined time after said unidirectional voltage source is applied to said positive and negative input terminals.

4. An electrical circuit for isolating a load circuit from voltage transients produced when a power supply is energized comprising first and second input terminals for connecting to said power supply, first and second output terminals for connecting to said load circuit, a controlled rectifier having an anode electrode, cathode electrode, and a control electrode, said anode electrode being connected to said first input terminal and said cathode electrode being connected to said first output terminal, said second input and output terminals being connected to a common point, first and second resistors connected serially between said first and second input terminals, said first resistor being connected to said first input terminal and said second resistor being connected to said second input terminal, a semiconductor diode connected from the junction of said first and second resistors to said control electrode and being so poled to allow current to flow from the junction of said first and second resistors to said control electrode, a first capacitor connected in parallel circuit relation with said second resistor, a third resistor connected from the first output terminal to said control electrode, a second capacitor connected from the first output terminal to said control electrode, the values of said first and second resistors and first capacitor being chosen to cause said controlled rectifier to change from its blocking to a conducting state a predetermined interval of time after application of the power supply voltage to said first and second input terminals, the values of said third resistor, second capacitor and semiconductor diode being chosen to protect said silicon controlled rectifier during the switching of said controlled rectifier.

References Cited in the file of this patent
FOREIGN PATENTS
1,093,821    Germany _____ Dec. 1, 1960